(12) United States Patent
Honda

(10) Patent No.: US 6,381,971 B2
(45) Date of Patent: May 7, 2002

(54) AIR CONDITIONING SYSTEM WITH COMPRESSOR PROTECTION

(75) Inventor: Keita Honda, Okazaki (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/795,542

(22) Filed: Feb. 28, 2001

(30) Foreign Application Priority Data

Mar. 6, 2000 (JP) ........................................ 2000-060459

(51) Int. Cl.$^7$ ................................................ B60H 1/00
(52) U.S. Cl. ........................ 62/126; 62/228.3; 62/228.5
(58) Field of Search .................... 62/125, 126, 127, 62/129, 131, 157, 158, 231, 228.1, 228.3, 228.4, 228.5

(56) References Cited

U.S. PATENT DOCUMENTS 5,054,294 A * 10/1991 Dudley ...................... 62/228.4
5,222,368 A * 6/1993 Hanson ........................ 62/126

FOREIGN PATENT DOCUMENTS

JP        A-8-282253        10/1996

* cited by examiner

Primary Examiner—Harry B. Tanner
(74) Attorney, Agent, or Firm—Harness, Dickey & Pierce, PLC

(57) ABSTRACT

An air conditioning system includes compressor protective means for protecting a compressor. The compressor protective means includes first and second protective values. The first protective value is set for preventing a failure of a compressor. The second protective value is lower than the first protective value in order to prevent a high pressure in a refrigerant cycle system from reaching the first protective value. The compressor protective means sets the second protective value such that the second protective value used before an elapse of a predetermined time period from startup of the compressor is lower than the second protective value used after the elapse of the predetermined time period.

12 Claims, 7 Drawing Sheets

FIG. 6

| Δf (rpm/4sec) | En | | | | | | |
|---|---|---|---|---|---|---|---|
| | | NB | NM | NS | ZO | PS | PM | PB |
| Edot | NB | 600 | 600 | 600 | 600 | 300 | 150 | 70 |
| | NM | 600 | 600 | 600 | 300 | 150 | 70 | -150 |
| | NS | 600 | 300 | 220 | 150 | 70 | -150 | -300 |
| | ZO | 600 | 300 | 150 | 0 | -150 | -300 | -600 |
| | PS | 300 | 70 | -70 | -150 | -300 | -600 | -600 |
| | PM | 150 | -70 | -150 | -300 | -600 | -600 | -600 |
| | PB | 70 | -150 | -300 | -600 | -600 | -600 | -600 |

FIG. 8

| Δf (rpm/4sec) | En | | | | | | |
|---|---|---|---|---|---|---|---|
| | | NB | NM | NS | ZO | PS | PM | PB |
| Edot | NB | -200 | -200 | -200 | -200 | -150 | -50 | 0 |
| | NM | -200 | -200 | -150 | -100 | -40 | -30 | 100 |
| | NS | -200 | -100 | -80 | -20 | -10 | 50 | 200 |
| | ZO | -150 | -80 | -50 | 0 | 50 | 80 | 200 |
| | PS | -100 | -30 | 10 | 20 | 50 | 90 | 200 |
| | PM | 0 | 20 | 30 | 40 | 60 | 100 | 200 |
| | PB | 0 | 0 | 40 | 60 | 70 | 100 | 200 |

AIR CONDITIONING SYSTEM WITH COMPRESSOR PROTECTION

CROSS REFERENCE TO RELATED APPLICATION

This application is based on and incorporates herein by reference Japanese Patent Application No. 2000-60459 filed on Mar. 6, 2000.

BACKGROUND OF THE INVENTION

1. Field of the Invention

The present invention relates to an air conditioning system that carries out a protective control operation of a compressor when a high pressure in a refrigerant cycle of the air conditioning system becomes abnormally high, to prevent a failure of the compressor.

2. Description of Related Art

In a known type of refrigerant cycle system having an accumulator, if a compressor is operated while a high pressure in the refrigerant cycle system is abnormally high, the compressor will fail. To prevent the failure of the compressor, a first protective value is set near an upper tolerable pressure limit of the compressor. When the high pressure of the refrigerant cycle system exceeds the first protective value, the compressor is forcefully turned off.

Furthermore, a second protective value that is lower than the first protective value is set to prevent the high pressure from reaching the first protective pressure. When the high pressure exceeds the second protective value, a current rotational speed (capacity) of the compressor is maintained or reduced. Specifically, the second protective value is split into a low-pressure side second protective value and a high-pressure side second protective value. When the high pressure in the refrigerant cycle system exceeds the low-pressure side second protective value, the current compressor rotational speed is maintained. When the high pressure exceeds the high-pressure side second protective value, the compressor rotational speed is reduced. However, in the refrigerant cycle system, each one of the protective values is always the same regardless of operation time of the compressor. This causes the following problem at startup of the compressor.

That is, at the startup of the compressor, the compressor rotational speed increases very rapidly from zero to a target rotational speed, and thereby the high pressure in the refrigerant cycle system also increases very rapidly.

Also, at the startup of the compressor, gaseous refrigerant remained in a condenser near an outlet of the condenser is discharged from the outlet of the condenser without completely dissipating its heat. Thus, a gas to liquid ratio of refrigerant at the outlet of the condenser increases. In the refrigerant cycle system having the accumulator, a gas-liquid separator (receiver) that separates refrigerant into gas refrigerant and liquid refrigerant is not arranged between the condenser and a decompressor. As a result, refrigerant discharged from the outlet of the condenser is not separated into the gas refrigerant and the liquid refrigerant before entering into the decompressor. Thus, when the gas to liquid ratio of refrigerant is increased at the outlet of the condenser, a throttle degree of the decompressor increases, and thereby a high-pressure side refrigerant pressure of the refrigerant cycle system rapidly increases.

As a result, as shown in FIG. 10, the high pressure exceeds the second protective values (HPV2, LPV2) at the startup of the compressor. In FIG. 10, PV1 indicates the first protective value, HPV2 indicates the high-pressure side second protective value, and LPV2 indicates the low-pressure side second protective value.

When the high pressure exceeds the second protective values, the current compressor rotational speed is maintained or reduced. However, due to the rapid increase of the high pressure, the high pressure may also exceed the first protective value (PV1), causing forceful shutdown of the compressor. If this happens, the compressor needs to be restarted, and the restart of the compressor disadvantageously requires a certain amount of time.

Furthermore, when the high pressure exceeds the low-pressure side second protective value (LPV2) and then the high-pressure side second protective value (LPV2), the compressor rotational speed is forcefully reduced. In this way, the high pressure decreases below the high-pressure side second protective value (HPV2). At this time point, the current compressor rotational speed is maintained to keep the high pressure between the high-pressure side second protective value (HPV2) and the low-pressure side second protective value (LPV2). However, the compressor rotational speed decreases at a maximum rate. Thus, the high pressure may continue to decrease and thereby may become lower than the low-pressure side second protective value (LPV2). In such a case, since the current operating condition of the air conditioning system has not been changed and thereby still causes the high pressure to increase. Thus, the high pressure may increase once again, and start performance of the compressor is deteriorated.

SUMMARY OF THE INVENTION

The present invention addresses the above-described problems. Thus, it is an objective of the present invention to provide an air conditioning system having a refrigerant cycle system, which improves starting performance of a compressor while protecting the compressor.

To achieve the objective of the present invention, an air conditioning system has a compressor protective control unit having first and second protective values. The first protective value is set for preventing a failure of a compressor. The second protective value is lower than the first protective value in order to prevent a high pressure in a refrigerant cycle system from reaching the first protective value. The compressor protective control unit maintains or reduces a capacity of the compressor when the high pressure in the refrigerant cycle system exceeds the second protective value. The compressor protective control unit turns off the compressor when the high pressure exceeds the first protective value. The compressor protective control unit sets the second protective value such that the second protective value used before an elapse of a predetermined time period from startup of the compressor is lower than the second protective value used after the elapse of the predetermined time period. Accordingly, the air conditioning system improves start performance of the compressor, while protecting the compressor.

BRIEF DESCRIPTION OF THE DRAWINGS

Additional objects and advantages of the present invention will be more readily apparent from the following detailed description of a preferred embodiment when taken together with the accompanying drawings, in which:

FIG. 6 is a view showing a fuzzy rule used during the cooling mode;

FIG. 8 is a view showing a fuzzy rule used during the heating mode;

DETAILED DESCRIPTION OF THE PRESENTLY PREFERRED EMBODIMENT

An air conditioning system of an electric vehicle according to a preferred embodiment of the present invention will be described with reference to FIGS. 1–9. First, constructions of an interior air conditioning unit 1 placed in an interior of a passenger compartment and a refrigerant cycle system 9 will be described with reference to FIG. 1.

Figure 1:
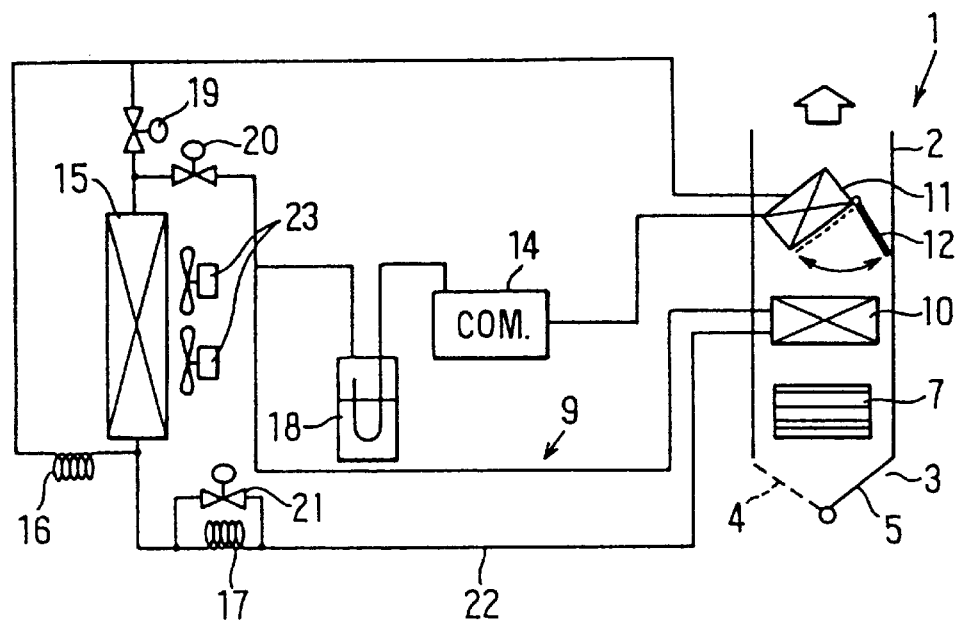
FIG. 1 is a schematic diagram of an air conditioning system of an electric vehicle according to a preferred embodiment of the present invention.

As shown in FIG. 1, the interior air conditioning unit 1 includes an air conditioning case 2. The air conditioning case 2 defines an air passage that leads conditioned air into the interior of the passenger compartment. At upstream of the air conditioning case 2, an inside air suction port 3, an outside air suction port 4 and an inside/outside air switching door 5 are arranged. The inside air suction port 3 is provided for sucking inside air from the passenger compartment. The outside air suction port 4 is provided for sucking outside air outside the passenger compartment. The inside/outside air switching door 5 is disposed for selectively opening and closing the inside air suction port 3 and the outside air suction port 4. The inside/outside air switching door 5 is driven by a servo motor 6 (see FIG. 2).

A fan 7 for generating an air flow in the air passage is disposed downstream of the inside/outside air switching door 5. The fan 7 is driven by a blower motor 8. An interior evaporator 10 constituting a part of the refrigerant cycle system 9 is disposed downstream of the fan 7. The interior evaporator 10 is used for cooling air by a heat absorbing reaction of refrigerant flowing through the interior evaporator 10 during a cooling mode which will be described in detail below.

An interior condenser 11 constituting a part of the refrigerant cycle system 9 is located downstream of the interior evaporator 10. The interior condenser 11 is used for heating air by heat radiating reaction of refrigerant flowing through the interior condenser 11 during a heating mode which will be described in detail below.

An air mixing door 12 is located adjacent to the interior condenser 11. The air mixing door 12 adjusts the amount of air passing through the interior condenser 11 and the amount of air bypassing the interior condenser 11. The air mixing door 12 is driven by a servo motor 13 (see FIG. 2).

At a downstream side of the air conditioning case 2, a face air outlet, a foot air outlet and a defroster air outlet are provided. The face air outlet is provided for blowing conditioned air toward the upper half body of a passenger in the passenger compartment. The foot air outlet is provided for blowing conditioned air toward the feet of the passenger in the passenger compartment. The defroster air outlet is provided for blowing conditioned air toward an inner surface of a windshield. An air outlet mode switching member is provided for opening and closing the face air outlet, the foot air outlet and the defroster air outlet.

The refrigerant cycle system 9 is a heat pump type refrigerant cycle system that cools and heats the passenger compartment by use of the interior evaporator 10 and the interior condenser 11, respectively. Besides the evaporator 10 and the condenser 11, the refrigerant cycle system 9 further includes a compressor 14, an exterior heat exchanger 15, a heating capillary tube 16, a cooling capillary tube 17, an accumulator 18 and solenoid valves 19–21, all of which are fluidly connected by a refrigerant pipe 22.

Exterior fans 23 for blowing air toward the exterior heat exchanger 15 are arranged adjacent to the exterior heat exchanger 15. The exterior fans 23 are driven by an exterior fan motor 24 (FIG. 2).

Figure 2:
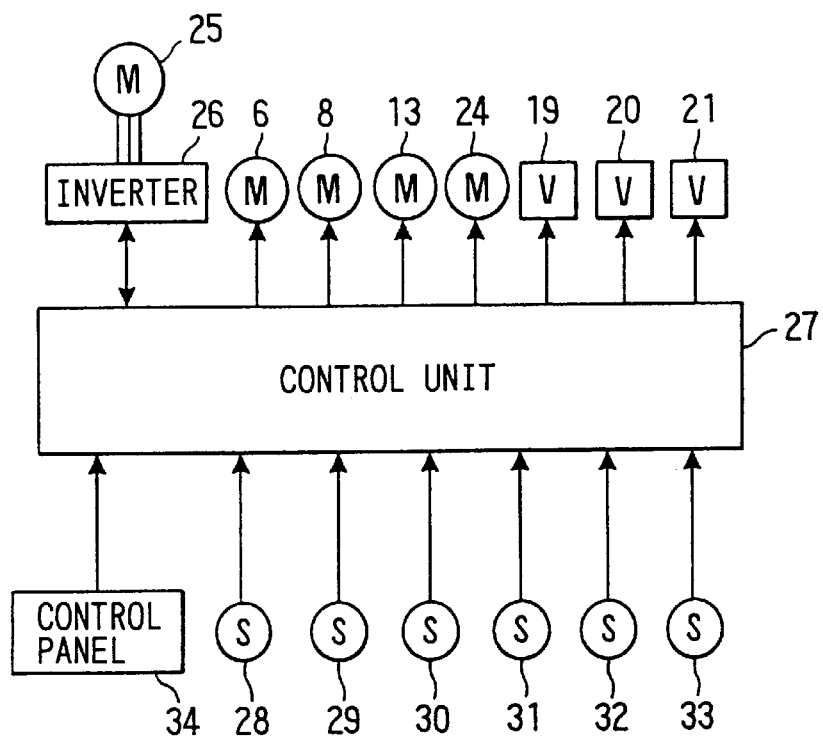
FIG. 2 is a block diagram showing a control unit of the air conditioning system according to the embodiment.

The compressor 14 sucks, compresses and then discharges refrigerant when it is driven by an electric motor 25 (FIG. 2). The electric motor 25 and the compressor 14 are integrally arranged within a sealed case. A rotational speed of the electric motor 25 is controlled by an inverter 26 (FIG. 2) to be linearly changed. Energization of the inverter 26 is controlled by a control device 27 (FIG. 2).

The exterior heat exchanger 15 acts as an evaporator during a heating mode and acts as a condenser during a cooling mode.

The heating capillary tube 16 acts as decompressing means during the heating mode. The cooling capillary tube 17 acts as decompressing means during the cooling mode. Each capillary tube 16 or 17 acts as a fixed throttle for restricting a flow of refrigerant. Therefore, refrigerant decompresses while passing through the heating capillary tube 16 or the cooling capillary tube 17.

The accumulator 18 is arranged in the refrigerant cycle system 9 between the compressor 14 and the interior evaporator 10 or the exterior heat exchanger 15. The accumulator 18 is a gas-liquid separator for separating refrigerant from the interior evaporator 10 or the exterior heat exchanger 15 into gas refrigerant and liquid refrigerant. Because of the accumulator 18, the compressor 14 can always suck the gaseous refrigerant.

Energization of each one of the solenoid valves 19–21 is controlled by the control device 27 (FIG. 2).

The control device 27 of the vehicle air conditioning system according to the present embodiment will be described with reference to FIG. 2.

The control device 27 includes a known microcomputer, an A/D converter circuit, a timer and the like. The microcomputer includes a CPU, a ROM, a RAM and the like.

The control device 27 is activated when a key switch (not shown) is turned on and power from a battery (not shown) is supplied to the control device 27. The key switch is turned on or off when the vehicle passenger turns a key cylinder (not shown) with a key in a corresponding direction.

With reference to FIG. 2, an inside air temperature sensor 28 measures an inside air temperature of the passenger compartment. An outside air temperature sensor 29 measures an outside air temperature of the passenger compartment. A solar radiation sensor 30 measures the amount of solar radiation reaching the interior of the passenger compartment. An exterior refrigerant sensor 31 measures a temperature of refrigerant at an outlet of the exterior heat exchanger 15. A post-evaporator sensor 32 measures a temperature (hereinafter called "post-evaporator temperature") of air right after passing through the interior evaporator 10. A pressure sensor 33 measures a pressure (hereinafter called "high pressure) of refrigerant at the high pressure side of the refrigerant cycle system 9. Signals outputted from these sensors 28–33 are fed to input terminals of the control device 27. Furthermore, signals outputted from an air conditioning setting member (such as a temperature setting unit) provided on a control panel 34 are also fed to the input terminals of the control device 27.

The signals outputted from the sensors 28–33 and the signals outputted from the control panel 34 are converted from analog to digital by the A/D converter circuit before entering the microcomputer.

Control signals are outputted from output terminals of the control device 27 to the blower motor 8, the servo motors 6 and 13, the solenoid valves 19–21, the exterior fan motor 24 and the inverter 26.

A control process that is carried out by the microcomputer when the key switch is turned on will be discussed with reference to a flow diagram shown in FIG. 3.

Figure 3:
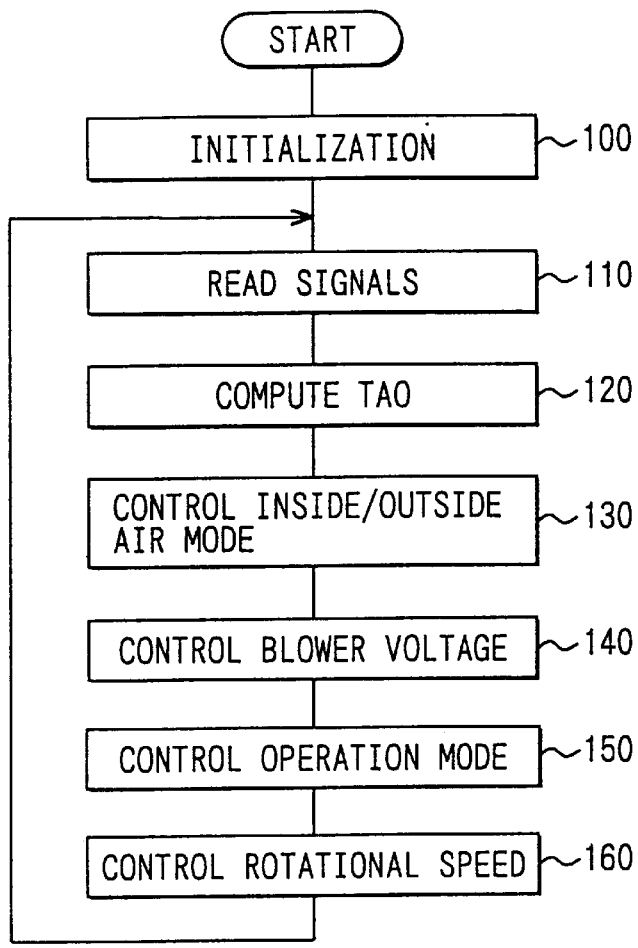
FIG. 3 is a flow diagram showing a control operation carried out by a microcomputer of the air conditioning system.

When a control routine shown in FIG. 3 starts, an initialization is performed at step 100. Then, at step 110, the signals from the sensors 28–33 and the signals from the control panel 34 are read. Next, at step 120, a target air temperature TAO that is a target temperature of air blown into the passenger compartment from the air conditioning system is computed according to the following equation (1) stored in the ROM:

$$TAO(°C.)=Kset \times Tset-Kr \times Tr-Kam \times Tam-Ks \times Ts+C \quad (1)$$

where:

Tset is a set air temperature of the passenger compartment set by the vehicle passenger through the temperature setting unit provided on the control panel 34;

Tr is the inside air temperature measured by the inside air temperature sensor 28;

Tam is the outside air temperature measured by the outside air temperature sensor 29;

Ts is the amount of solar radiation measured by the solar radiation sensor 30;

Kset, Kr, Kam and Ks are gains; and

C is a constant.

Then, at step 130, an air suction mode is selected between the inside air mode and the outside air mode based on the target air temperature TAO using a control characteristic (not shown). Then, control moves to step 140 where a blower voltage applied to the blower motor 8 is controlled based on the TAO using a control characteristic (not shown).

Figure 4:
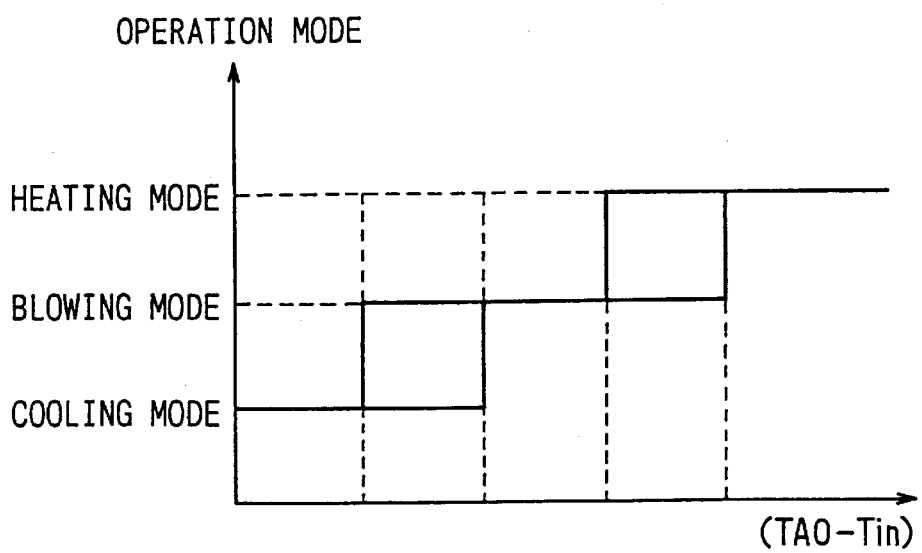
FIG. 4 is a graph for setting an operation mode among a cooling mode, a blowing mode and a heating mode according to the first embodiment.
Figure 5A:
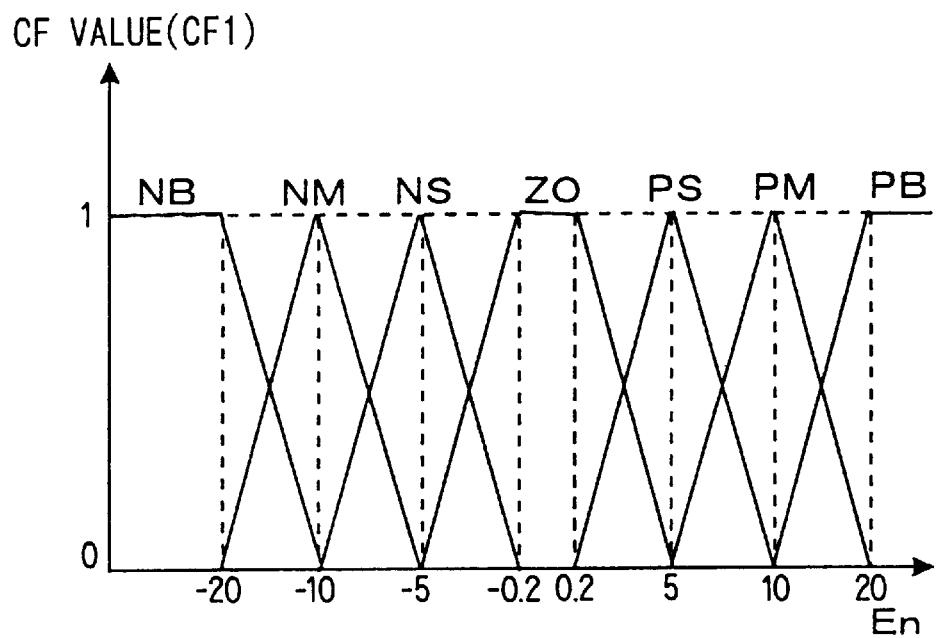
FIG. 5A is a view showing a membership function used during the cooling mode.
Figure 5B:
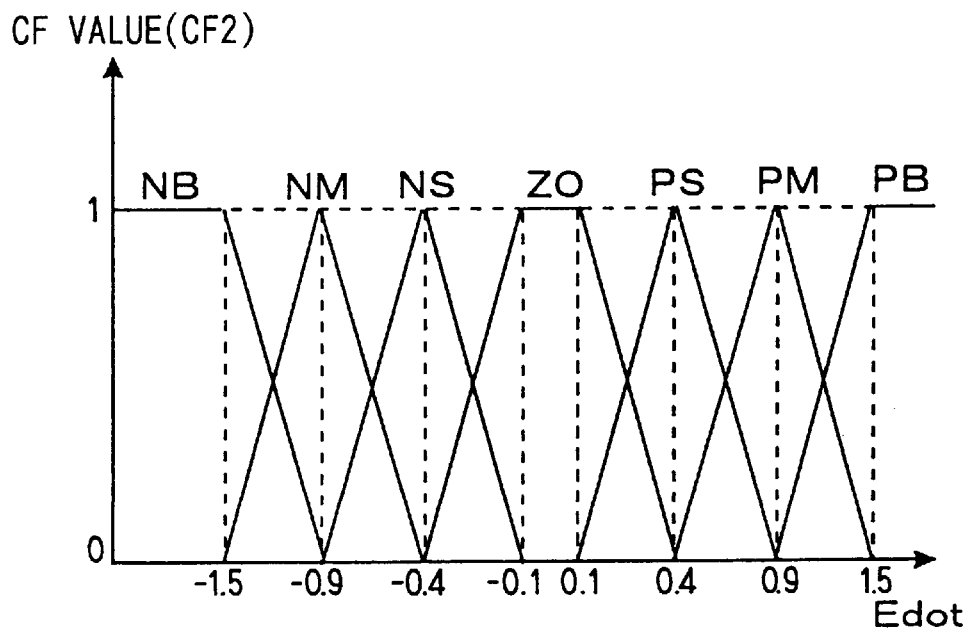
FIG. 5B is a view showing an another membership function used during the cooling mode.
Figure 7A:
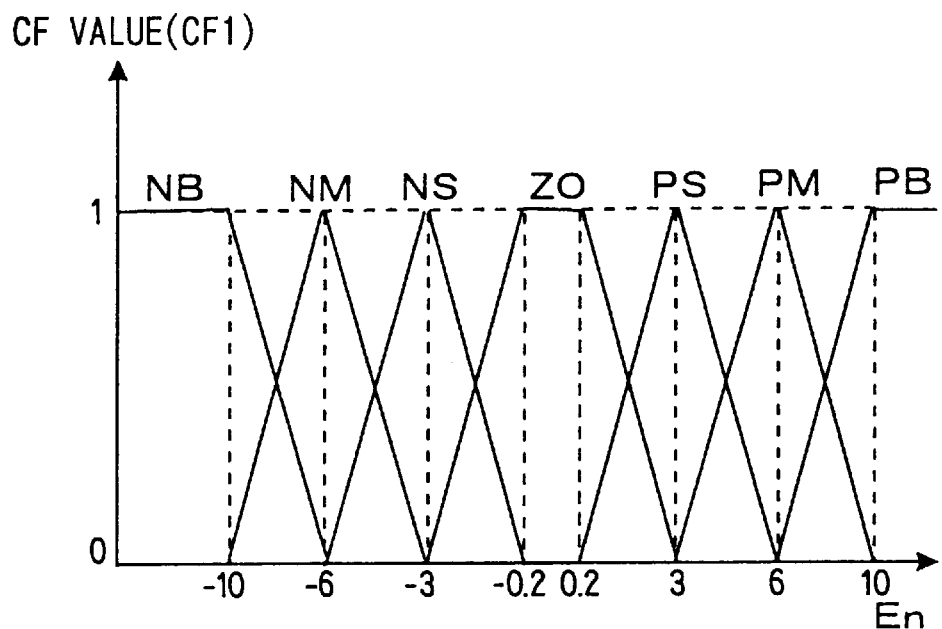
FIG. 7A is a view showing a membership function used during the heating mode.
Figure 7B:
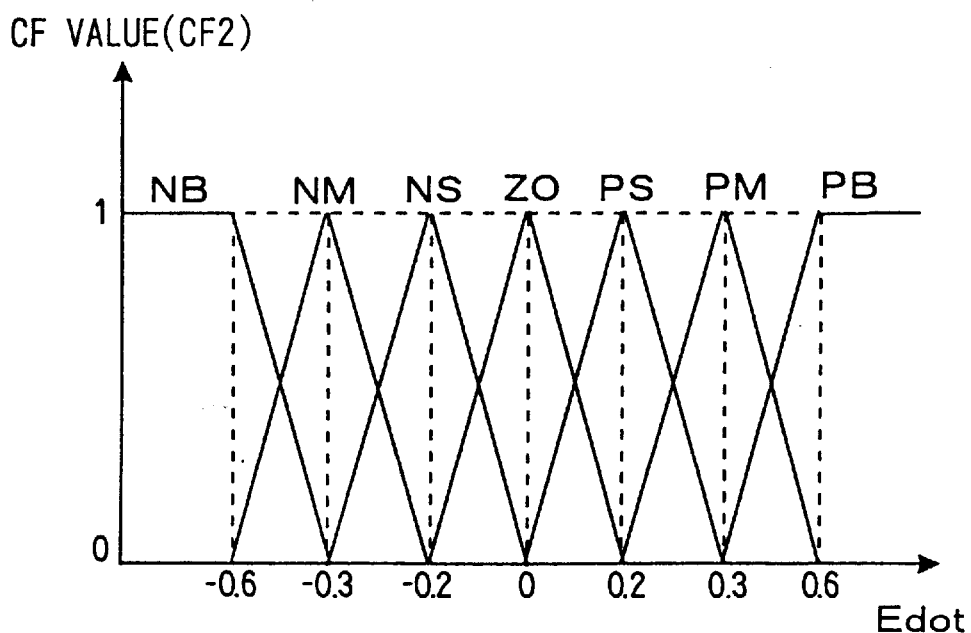
FIG. 7B is a view showing an another membership function used during the heating mode.

At step 150, an operation mode is selected among the cooling mode, the blowing mode and the heating mode based on a difference between the TAO and a sucked air temperature Tin, as shown in FIG. 4. The sucked air temperature Tin is the inside air temperature Tr (Tin=Tr) during the inside air mode, and is the outside air temperature Tam (Tin=Tam) during the outside air mode.

During the cooling mode, the exterior fans 23 are operated. Furthermore, in the refrigerant cycle system 9, the solenoid valve 19 is opened, and the solenoid valves 20 and 21 are closed. In this way, refrigerant in the refrigerant cycle system 9 is circulated through the compressor 14, the interior condenser 11, the exterior heat exchanger 15, the cooling capillary tube 17, the interior evaporator 10, the accumulator 18 and the compressor 14 in this order. In addition, in the interior air conditioning unit 1, the air mixing door 12 is positioned to completely close off an inlet opening of the interior condenser 11 so that all air bypasses the interior condenser 11.

During the blowing mode, both the compressor 14 and the exterior fans 23 are turned off.

During the heating mode, the exterior fans 23 are operated. Furthermore, in the refrigerant cycle system 9, the solenoid valves 19 and 21 are closed, and the solenoid valve 20 is opened. In this way, refrigerant in the refrigerant cycle system 9 is circulated through the compressor 14, the interior condenser 11, the heating capillary tube 16, the exterior heat exchanger 15, the accumulator 18 and the compressor 14 in this order. In addition, in the interior air conditioning unit 1, the air mixing door 12 is positioned to fully open the inlet opening of the interior condenser 11 so that all air passes through the interior condenser 11.

At the following step 160, the rotational speed (i.e., rotation number) of the compressor 14 is controlled as follows for each of the cooling mode and the heating mode. During the blowing mode, the control operation of step 160 is not performed.

(Cooling Mode)

First, a deviation En between the target air temperature TAO and the post-evaporator temperature TE measured by the post-evaporator temperature sensor 32, is computed according to the following equation (2).

$$En=TAO-TE \quad (2)$$

Then, a change rate Edot of the deviation En is computed according to the following equation (3).

$$Edot=En-En-1 \quad (3)$$

In this embodiment, En is renewed every four seconds, so that En-1 is a previous value obtained four seconds before En.

Then, a change rate Δf of the compressor rotational speed which increases or decreases relative to the previous rotational speed fn-1 of the compressor 14 measured four seconds before, is computed. The change rate Δf of the compressor rotational speed is computed through a fuzzy logic based on membership functions shown in FIGS. 5A and 5B and also based on rule values shown in FIG. 6 using the above computed En and Edot. The membership functions and the rule table are stored in the ROM. Specifically, based on CF1 obtained from FIG. 5A and CF2 obtained from FIG. 5B, a goodness of fit CF is computed according to the following equation (4).

$$CF=CF1 \times CF2 \quad (4)$$

Then, based on the computed goodness of fit CF and a rule value obtained from FIG. 6, the change rate Δf of the compressor rotational speed is computed according to the following equation (5).

$$\Delta f = \Sigma(CF \times \text{rule value})/\Sigma CF \text{ (rpm/4 sec)} \quad (5)$$

A next compressor rotational speed fn is computed according to the following equation (6).

$$fn=fn-1+\Delta f \text{ (rpm/4 sec)} \quad (6)$$

Then, the energization of the inverter 26 is controlled in such a way that an actual compressor rotational speed becomes the computed next compressor rotational speed fn.

(Heating Mode)

During the heating mode, a target pressure (hereinafter called "target high pressure") SPO of refrigerant in the high pressure side of the refrigerant cycle system 9 is determined based on the target air temperature TAO. Then, a deviation En between the target high pressure SPO and the high pressure SP measured by the pressure sensor 33 is computed according to the following equation (7).

$$En = SPO - SP \quad (7)$$

Then, a rate of change Δf of the compressor rotational speed, which increases or decreases relative to the previous compressor rotational speed fn-1 measured four seconds before, is computed. The change rate Δf of the compressor rotational speed is computed through a fuzzy logic based on membership functions shown in FIGS. 7A and 7B and also based on a rule table shown in FIG. 8 using the above computed En and Edot. The membership functions and the rule table are stored in the ROM. Specifically, based on CF1 obtained from FIG. 7A and CF2 obtained from FIG. 7B, a goodness of fit CF is computed according to the above equation (4). Then, based on the computed goodness of fit CF and a rule value obtained from the rule table shown in FIG. 8, the change rate Δf of the compressor rotational speed is computed according to the above equation (5).

Thereafter, a next compressor rotational speed fn is computed according to the above equation (6). Then, the energization of the inverter 26 is controlled in such a way that an actual compressor rotational speed becomes the computed next compressor rotational speed fn.

In the above-described control operation of the compressor rotational speed, when the high pressure SP becomes abnormally high, a torque applied on an output shaft (not shown) of the electric motor 25 becomes high, thereby causing overheating and braking of a winding (not shown) of the electric motor 25. In the present embodiment, a control operation (hereinafter called "a protective control operation of the compressor 14") for preventing an occurrence of such an incidence is carried out.

The protective control operation of the compressor 14 is a main feature of the present embodiment and thereby is described in detail with reference to FIG. 9. Similar to the routine shown in FIG. 3, a routine shown in FIG. 9 starts when the key switch is turned on.

Figure 9:
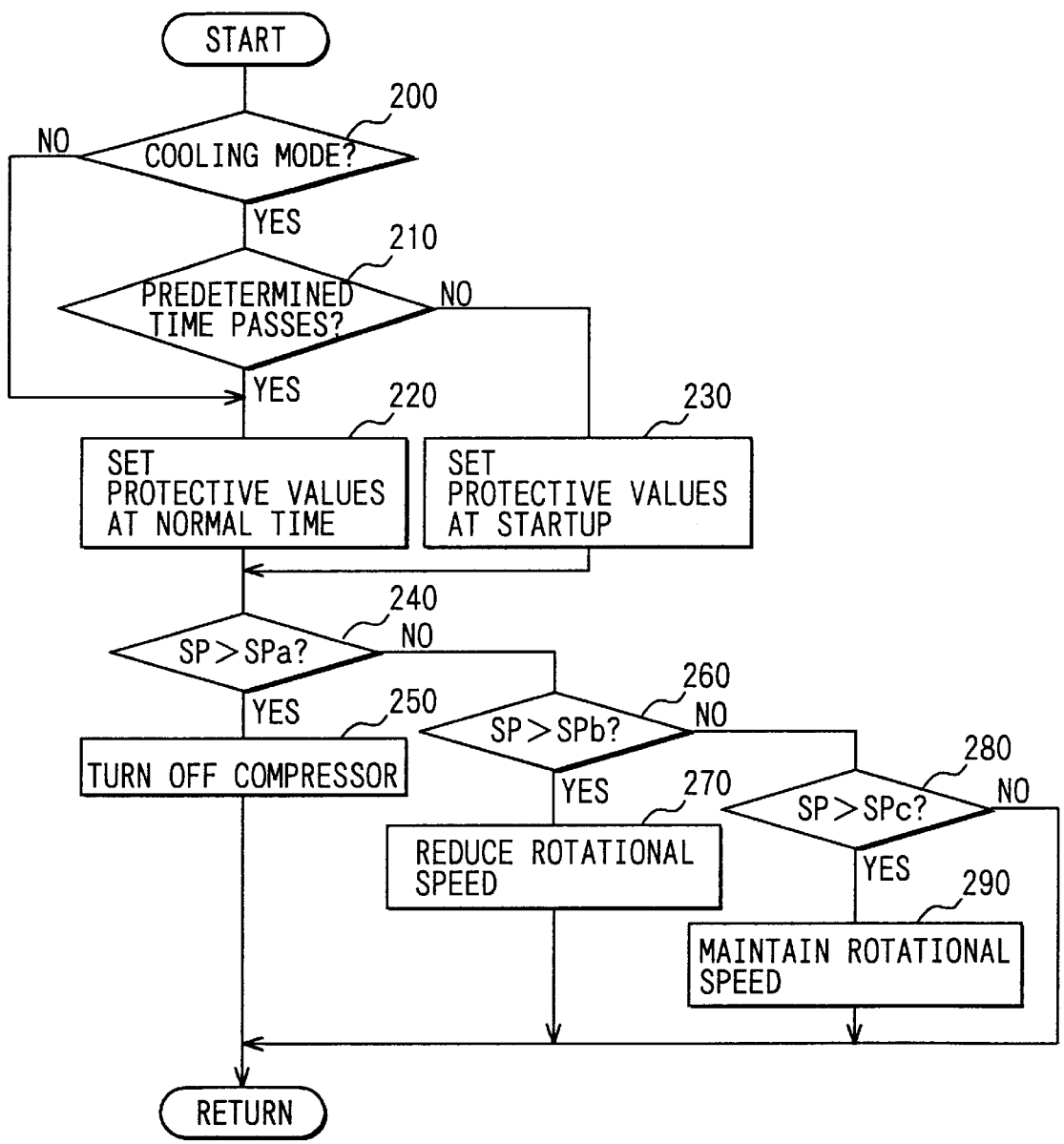
FIG. 9 is a flow diagram showing a protective control operation of a compressor according to the embodiment.
Figure 10:
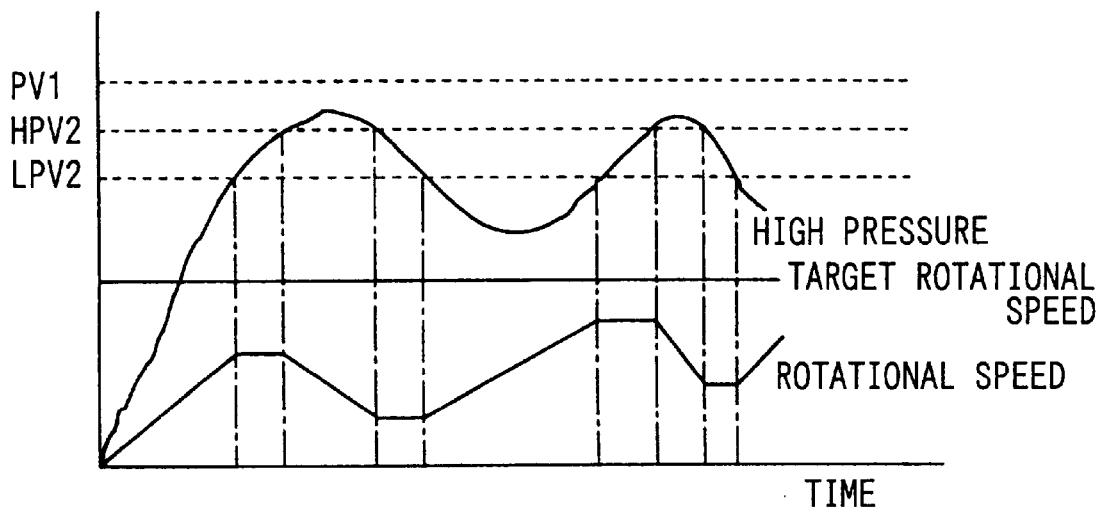
FIG. 10 is a graph showing characteristics of a high pressure, a target rotational speed and a rotational speed of a compressor at a start operation.

When the routine shown in FIG. 9 starts, control routine moves to step 200 where it is determined whether the current operation mode is the cooling mode. When the operation mode is the cooling mode, control routine moves to step 210. When the operation mode is not the cooling mode, control routine moves to step 220.

At step 210, it is determined whether a predetermined time period (2 minutes, for example) has elapsed from time of switching on of the key switch, i.e., from time of startup of the compressor 14. In this embodiment, the predetermined time period is the time period required for refrigerant at the outlet of the exterior heat exchanger 15 to be completely turned into liquid refrigerant from the time of startup of the compressor 14 during the cooling mode.

If the determination at step 210 is "YES", control routine proceeds to step 220. If the determination at step 210 is "NO", control routine proceeds to step 230.

Protective values for limiting the high pressure SP during a normal operating period are set at step 220. That is, a first protective value SPa is set to 27.5 kg/cm$^2$G. A high-pressure side second protective value SPb is set to 24 kg/cm$^2$G. A low-pressure side second protective value SPc is set to 22 kg/cm$^2$G.

The first protective value SPa is set around an upper tolerable pressure limit of the compressor 14 to prevent a failure of the compressor 14 (electric motor 25), that may be caused when the compressor 14 is operated while the high pressure of the refrigerant cycle system 9 is abnormally high.

The second protective values SPb and SPc are set below the first protective value SPa in order to prevent the high pressure SP from reaching the first protective value SPa. The low-pressure side second protective value SPc is lower than the high-pressure side second protective value SPb.

At step 230, protective values for limiting the high pressure SP during the startup period of the compressor 14 are set. That is, a first protective value SPa is set to 27.5 kg/cm$^2$G. The high-pressure side second protective value SPb is set to 23 kg/cm$^2$G. The low-pressure side second protective value SPc is set to 19 kg/cm$^2$G.

In other words, the second protective values SPb and SPc before elapse of the predetermined time period are set lower than the second protective values SPb and SPc after the elapse of the predetermined time period, respectively. Furthermore, a difference between the high-pressure side second protective value SPb and the low-pressure side second protective value SPc before the elapse of the predetermined time period is set greater than a difference between the high-pressure side second protective value SPb and the low-pressure side second protective value SPc after the elapse of the predetermined time period.

At the next step 240, it is determined whether the high pressure SP is higher than the first protective value SPa. If the determination at step 240 is "YES", control routine moves to step 250 where the compressor 14 is forcefully turned off. If the determination at step 240 is "NO", control routine moves to step 260.

At step 260, it is determined whether the high pressure SP is higher than the high-pressure side second protective value SPb. If the determination at step 260 is "YES", control routine moves to step 270. At step 270, the change rate Δf of the compressor rotational speed is set to −600 rpm/4 sec to forcefully reduce the compressor rotational speed fn. If the determination at step 260 is "NO", control moves to step 280. In this embodiment, as is obvious from the rule table shown in FIG. 6, −600 rpm/4 sec is the change rate Δf of the compressor rotational speed required for achieving a maximum degree of reduction in the compressor rotational speed fn.

At step 280, it is determined whether the high pressure SP is higher than the low-pressure side second protective value SPc. If the determination at step 280 is "YES", control routine moves to step 290 where the change rate Δf of the compressor rotational speed is set to zero, thereby forcefully maintaining the current compressor rotational speed fn.

According to the above-described embodiment, the second protective values SPb and SPc before the elapse of the predetermined time period are lower than the second protective values SPb and SPc after the elapse of the predetermined time period, respectively.

In this way, even if the high pressure SP rises quickly at the startup of the compressor 14, the compressor rotational speed fn is forcefully reduced and maintained at the early stage, so that the high pressure SP is effectively prevented from exceeding the first protective value SPa, thereby preventing the forceful stop of the compressor 14.

The difference between the high-pressure side second protective value SPb and the low-pressure side second protective value SPc before the elapse of the predetermined time period is increased in comparison to the difference between the high-pressure side second protective value SPb and the low-pressure side second protective value SPc after the elapse of the predetermined time period. Thus, the time period provided for maintaining the rotational speed fn is lengthened, allowing prevention of problematic hunting of the high pressure SP at the startup of the compressor 14.

Although the present invention has been fully described in connection with the preferred embodiment thereof with reference to the accompanying drawings, it is to be noted that various changes and modifications will become apparent to those skilled in the art.

For example, in the above embodiment, the high-pressure side second protective value SPb and the low-pressure side second protective value SPc are provided as the second protective value. Furthermore, both the high-pressure side second protective value SPb and the low-pressure side second protective value SPc before the elapse of the predetermined time period are set below the high-pressure side second protective value SPb and the low-pressure side second protective value SPc after the elapse of the predetermined time period, respectively. Alternatively, only one of the high-pressure side second protective value SPb and the low-pressure side second protective value SPc before the elapse of the predetermined time period can be set below the corresponding one of the high-pressure side second protective value SPb and the low-pressure side second protective value SPc after the elapse of the predetermined time period.

Furthermore, instead of providing both the high-pressure side second protective value SPb and the low-pressure side second protective value SPc as the second protective value, it is possible to use only one of the high-pressure side second protective value SPb and the low-pressure side second protective value SPc.

In the above-described embodiment, the difference between the high-pressure side second protective value SPb and the low-pressure side second protective value SPc before the elapse of the predetermined time period is made greater than the difference between the high-pressure side second protective value SPb and the low-pressure side second protective value SPc after the elapse of the predetermined time period. This can be accomplished without lowering the low-pressure side second protective value SPc by setting the high-pressure side second protective value SPb before the elapse of the predetermined time period to be higher than the high-pressure side second protective value SPb after the elapse of the predetermined time period.

In the above-described embodiment, whether the high pressure SP exceeds each one of the protective values SPa, SPb and SPc is determined by measuring the high pressure SP with the pressure sensor 33 and comparing the measured high pressure SP with each one of the protective values SPa, SPb and SPc. However, the high pressure SP can be estimated based on, for example, an output electric current of the inverter 26.

In the above-described embodiment, "the predetermined time period" is the time period required for refrigerant discharged from the outlet of the exterior heat exchanger 15 to be completely turned into liquid refrigerant after the startup of the compressor 14 during the cooling mode. However, "the predetermined time period" can be made longer than this time period.

In the above-described embodiment, the capillary tubes 16 and 17 are used as the decompressing means. The decompressing means can be, for example, any other type of a fixed throttle, such as a CTD, or can be any type of variable throttle, such as an electromagnetic expansion valve.

In the above-described embodiment, the target rotational speed fn of the compressor 14 is automatically determined based on a thermal load of the vehicle interior at step 160. Alternatively, the target rotational speed fn can be determined based on the set air temperature of the passenger compartment, that is set through the temperature setting unit.

Furthermore, in the above-described embodiment, when the high pressure SP exceeds each one of the protective values SPa, SPb and SPc, the protective control operation is carried out by changing the rotational speed of the compressor 14. Instead of changing the rotational speed of the compressor 14, a displacement of the compressor can be changed.

In the above-described embodiment, during the predetermined time period after the startup of the compressor 14, the second protective values SPb and SPc are set to be lowered, and the difference between the high-pressure side second protective value SPb and the low-pressure side second protective value SPc is made larger. Although this operation is only conducted during the cooling mode in the above-described embodiment, this operation can be also conducted during the heating mode.

In the above-described embodiment, the temperature of air blown out from the air conditioning system is controlled through the fuzzy logic. This temperature can be controlled through any other means.

In the above-described embodiment, the present invention is typically applied to the air conditioning system of the electric vehicle. The present invention is not limited to this and can be applied to an air conditioning system of an engine vehicle or a hybrid vehicle or an air conditioning system of a home or a building.

Such changes and modifications are to be understood as being within the scope of the present invention as defined by the appended claims.

What is claimed is:

1. An air conditioning system comprising:
    a refrigerant cycle including
        a compressor compressing refrigerant,
        a condenser condensing refrigerant,
        a decompressing unit decompressing refrigerant,
        an evaporator evaporating refrigerant, and
        an accumulator disposed between said evaporator and said compressor to separate refrigerant into gas refrigerant and liquid refrigerant, wherein said compressor, said condenser, said evaporator and said accumulator are connected to circulate refrigerant in said refrigerant cycle;
    target capacity setting means for setting a target capacity of said compressor;
    compressor control means for controlling a capacity of said compressor based on said target capacity set by said target capacity setting means; and
    compressor protective means having first and second protective values, said first protective value being set for preventing a failure of said compressor, said second protective value being lower than said first protective value in order to prevent a high pressure in said refrigerant cycle system from reaching said first protective value, said compressor protective means maintaining or reducing said capacity of said compressor when said high pressure exceeds said second protective value, said compressor protective means turning off said compressor when said high pressure exceeds said first protective value,
    wherein said compressor protective means sets said second protective value in such a manner that said second protective value used before an elapse of a predetermined time period from startup of said compressor is lower than said second protective value used after said elapse of said predetermined time period.

2. An air conditioning system according to claim 1, wherein:
   said second protective value includes at least a high-pressure side second protective value;
   said compressor protective means reduces said capacity of said compressor when said high pressure exceeds said high-pressure side second protective value; and
   said compressor protective means sets said high-pressure side second protective value in such a manner that said high-pressure side second protective value used before said elapse of said predetermined time period from said startup of said compressor is lower than said high-pressure side second protective value used after said elapse of said predetermined time period.

3. An air conditioning system according to claim 1, wherein:
   said second protective value includes at least a low-pressure side second protective value;
   said compressor protective means maintains said capacity of said compressor when said high pressure exceeds said low-pressure side second protective value; and
   said compressor protective means sets said low-pressure side second protective value in such a manner that said low-pressure side second protective value used before said elapse of said predetermined time period from said startup of said compressor is lower than said low-pressure side second protective value used after said elapse of said predetermined time period.

4. An air conditioning system according to claim 1, wherein:
   said second protective value includes a high-pressure side second protective value and a low-pressure side second protective value that is lower than said high-pressure side second protective value;
   said compressor protective means maintains said capacity of said compressor when said high pressure exceeds said low-pressure side second protective value;
   said compressor protective means reduces said capacity of said compressor when said high pressure exceeds said high-pressure side second protective value;
   said compressor protective means sets said low-pressure side second protective value in such a manner that said low-pressure side second protective value used before said elapse of said predetermined time period from said startup of said compressor is lower than said low-pressure side second protective value used after said elapse of said predetermined time period.

5. An air conditioning system according to claim 1, wherein said compressor is driven by an electrical motor.

6. An air conditioning system according to claim 1, wherein said capacity of said compressor is a rotational speed of said compressor.

7. An air conditioning system according to claim 1, wherein said second protective value is reduced during a cooling mode of said air conditioning system.

8. An air conditioning system comprising:
   a refrigerant cycle system including
      a compressor compressing refrigerant;
      a condenser condensing refrigerant;
      a decompressing unit decompressing refrigerant;
      an evaporator evaporating refrigerant; and
      an accumulator arranged between said evaporator and said compressor to separate refrigerant into gas refrigerant and liquid refrigerant, wherein said compressor, said condenser, said evaporator and said accumulator are connected to circulate refrigerant in said refrigerant cycle;
   target capacity setting means for setting a target capacity of said compressor;
   compressor control means for controlling a capacity of said compressor based on said target capacity set by said target capacity setting means; and
   compressor protective means having first and second protective values, said first protective value being set for preventing a failure of said compressor, said second protective value being lower than said first protective value in order to prevent a high pressure in said refrigerant cycle system from reaching said first protective value, said second protective value including a high-pressure side second protective value and a low-pressure side second protective value that is lower than said high-pressure side second protective value, said compressor protective means maintaining said capacity of said compressor when said high pressure in said refrigerant cycle system exceeds said low-pressure side second protective value, said compressor protective means reducing said capacity of said compressor when said high pressure exceeds said high-pressure side second protective value, said compressor protective means turning off said compressor when said high pressure exceeds said first protective value;
   wherein said compressor protective means sets a difference between said high-pressure side second protective value and said low-pressure side second protective value in such a manner that said difference before elapse of a predetermined time period from startup of said compressor is smaller than said difference after said elapse of said predetermined time period.

9. An air conditioning system according to claim 1, wherein said decompressing unit is a fixed throttle.

10. An air conditioning system according to claim 8, wherein said compressor is driven by an electrical motor.

11. An air conditioning system according to claim 8, wherein said capacity of said compressor is a rotational speed of said compressor.

12. An air conditioning system according to claim 8, wherein said second protective value is reduced during a cooling mode of said air conditioning system.

* * * * *